March 8, 1966 K. R. SCHNEIDER 3,239,040
LATCH OPERATED CLUTCH AND BRAKE
Filed July 22, 1963 5 Sheets-Sheet 1

INVENTOR
KURT R. SCHNEIDER

BY Mason, Porter, Diller & Stewart

ATTORNEYS

March 8, 1966 K. R. SCHNEIDER 3,239,040
LATCH OPERATED CLUTCH AND BRAKE
Filed July 22, 1963 5 Sheets-Sheet 2

INVENTOR
KURT R. SCHNEIDER

BY Mason, Porter, Diehl & Stewart,

ATTORNEYS

March 8, 1966   K. R. SCHNEIDER   3,239,040
LATCH OPERATED CLUTCH AND BRAKE
Filed July 22, 1963   5 Sheets-Sheet 3

INVENTOR
KURT R. SCHNEIDER

BY Mason, Porter, Diller & Stewart
ATTORNEYS

March 8, 1966 K. R. SCHNEIDER 3,239,040
LATCH OPERATED CLUTCH AND BRAKE
Filed July 22, 1963 5 Sheets-Sheet 4

INVENTOR
KURT R. SCHNEIDER

BY Mason, Porter, Diller & Stewart,
ATTORNEYS

March 8, 1966 K. R. SCHNEIDER 3,239,040
LATCH OPERATED CLUTCH AND BRAKE
Filed July 22, 1963 5 Sheets-Sheet 5

INVENTOR
KURT R. SCHNEIDER

BY Mason, Porter, Diller & Stewart,
ATTORNEYS

United States Patent Office 3,239,040
Patented Mar. 8, 1966

3,239,040
LATCH OPERATED CLUTCH AND BRAKE
Kurt Rudolf Schneider, Bainbridge, N.Y., assignor to Eureka Specialty Printing Company, Scranton, Pa., a corporation of Delaware
Filed July 22, 1963, Ser. No. 296,776
11 Claims. (Cl. 192—16)

This invention relates to a clutch and actuator structure by which cycles of operation can be initiated and terminated.

The structure comprises a constantly driving member and a member which is to be intermittently driven in cycles, clutch means for connecting the members, and a releasing and relatching device for controlling the operation of the clutch means.

Figure 1:
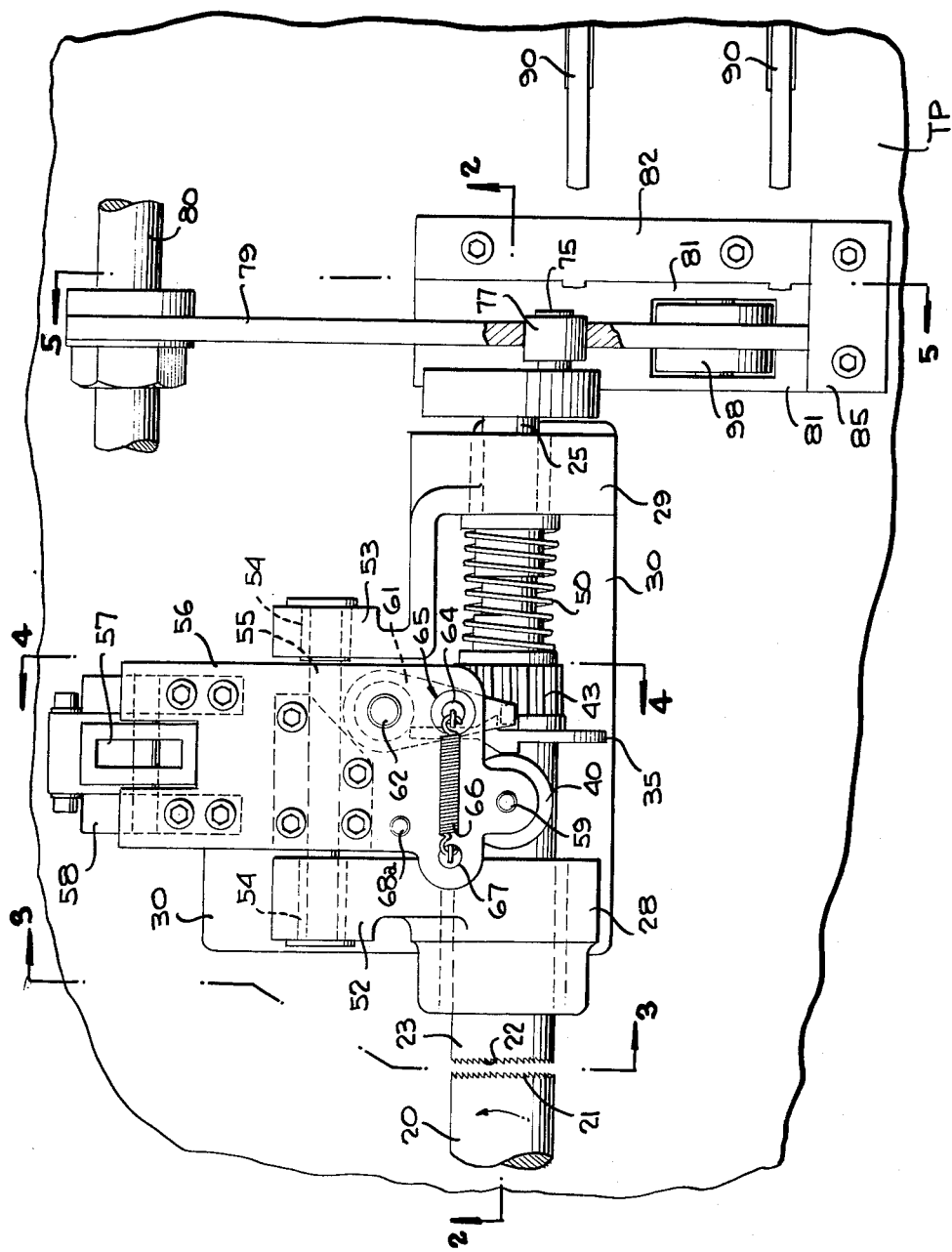
Figure 2:
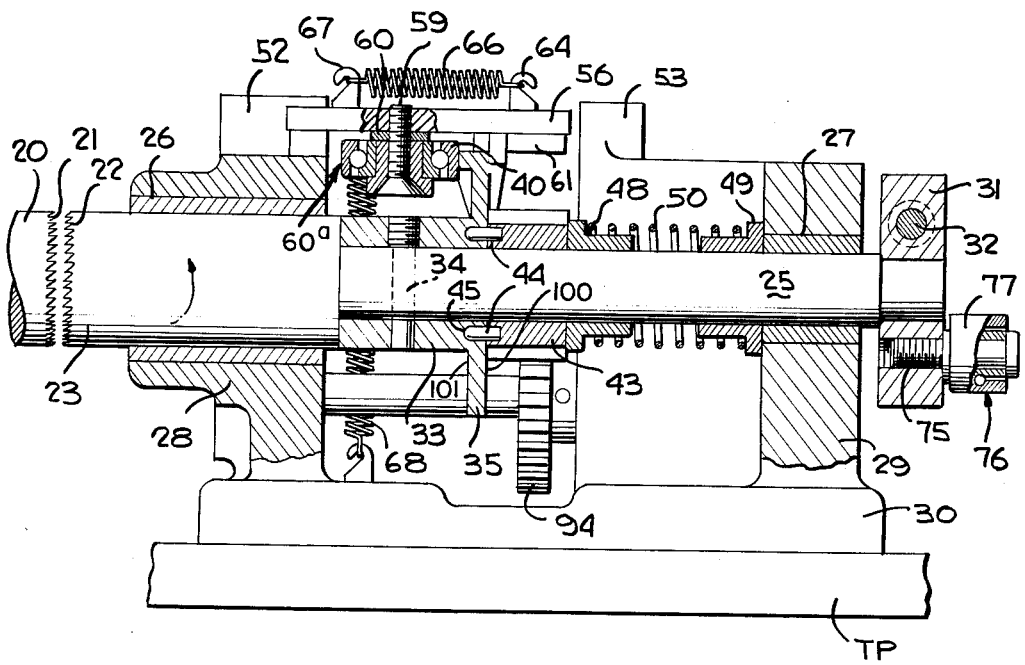
Figure 3:
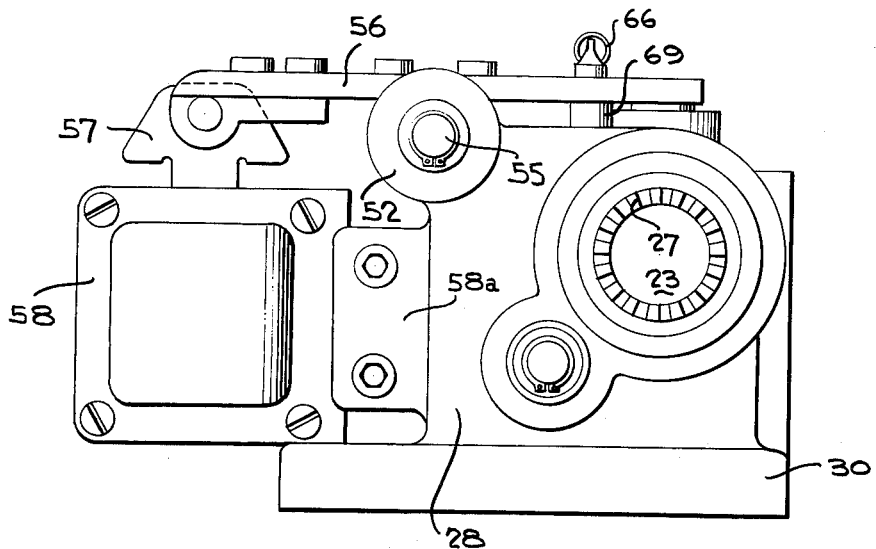
Figure 4:
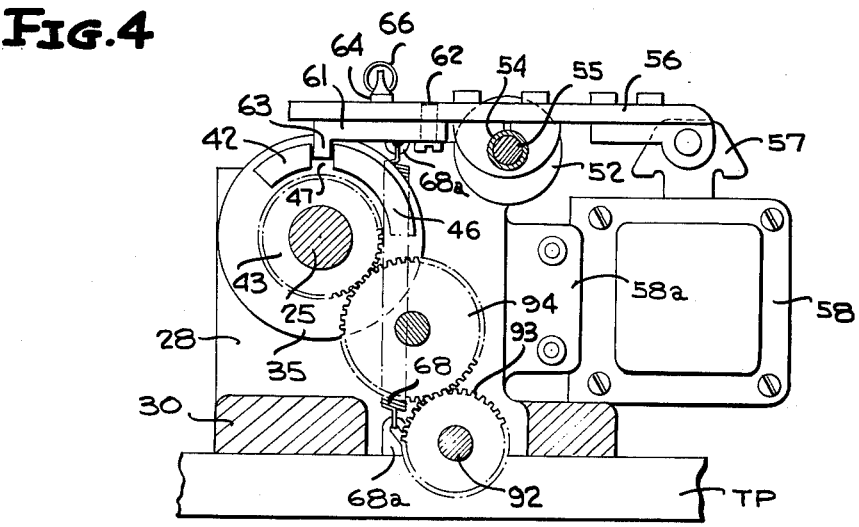
Figure 5:
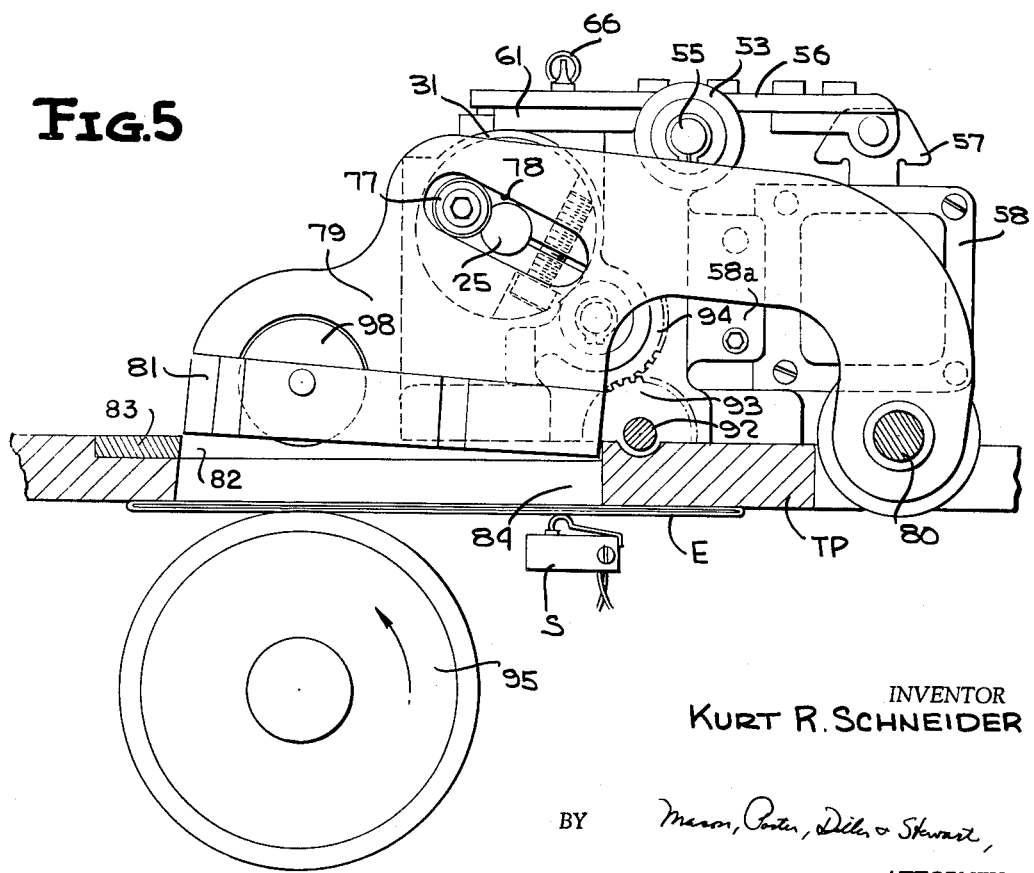
Figure 5A:
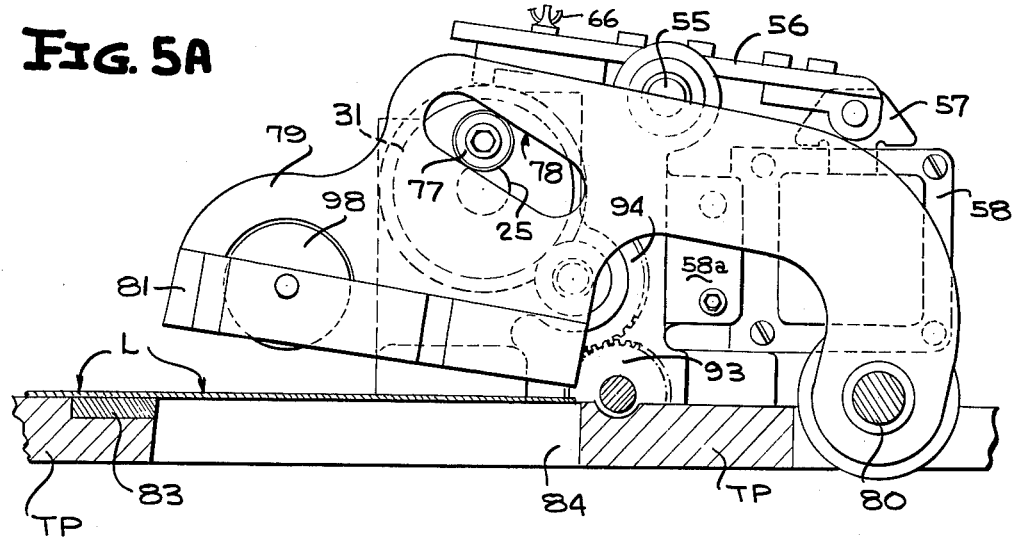
Figure 5B:
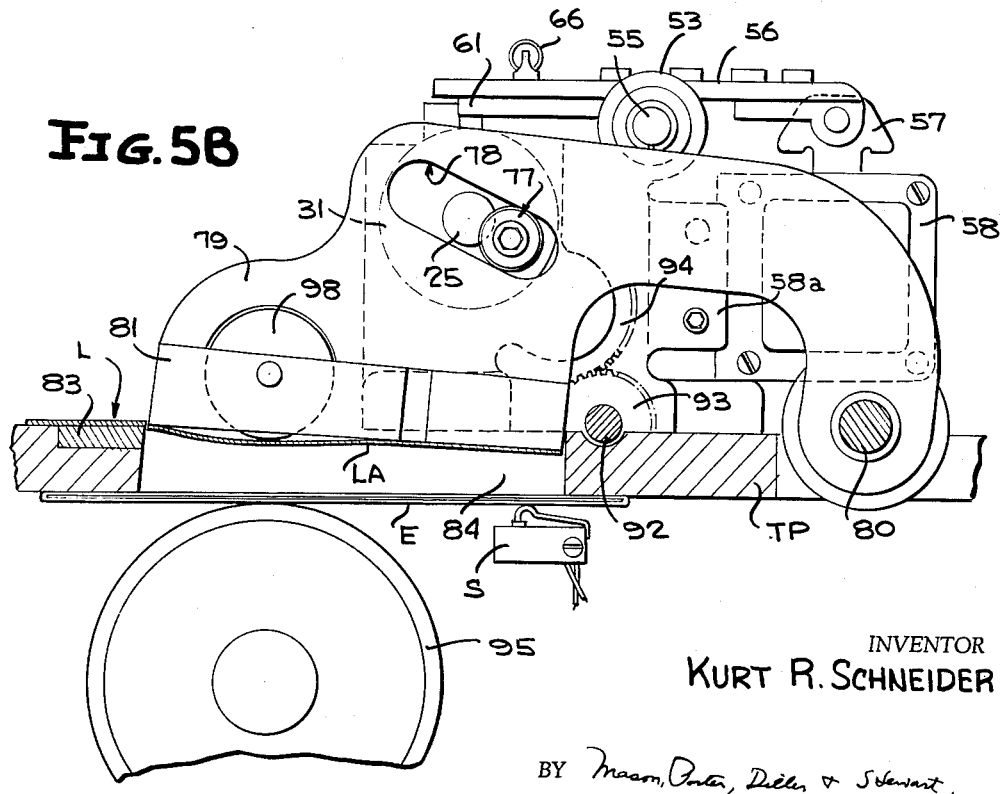
Figure 6:
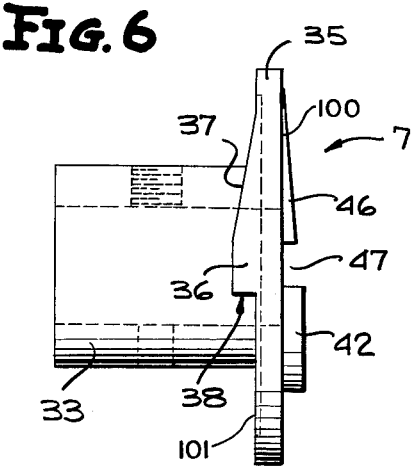
Figure 7:
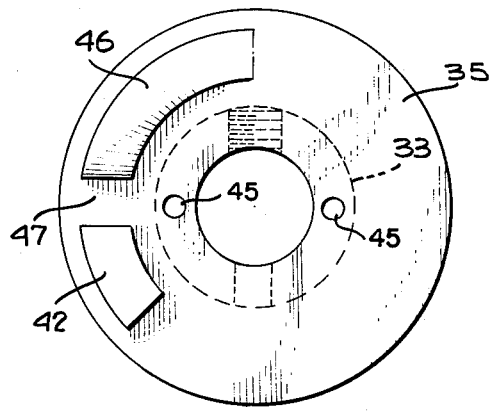
Figure 8:
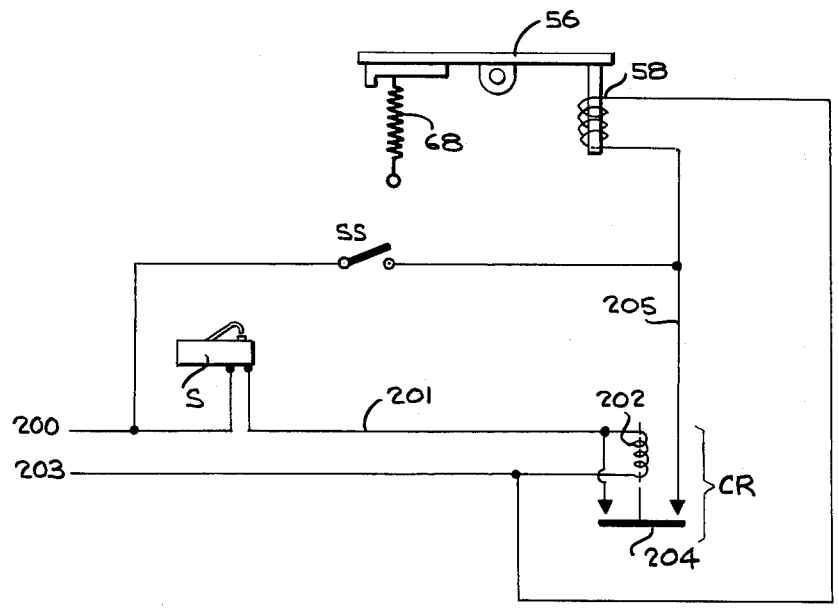

An illustrative embodiment of the invention, and an illustrative employment thereof, are shown in the accompanying drawings, in which:

FIGURE 1 is a plan view;
FIGURE 2 is an axial section, substantially on line 2—2 of FIGURE 1;
FIGURE 3 is a transverse section, substantially on broken line 3—3 of FIGURE 1;
FIGURE 4 is a transverse section, substantially on line 4—4 of FIGURE 1;
FIGURE 5 is a transverse section, substantially on line 5—5 of FIGURE 1;
FIGURES 5A and 5B show parts as in FIGURE 5, but in successive positions in a cycle of movement;
FIGURE 6 is a side view of a sleeve and cam disk assembly;
FIGURE 7 is a face view of the assembly, in the direction of the arrow 7 in FIGURE 6;
FIGURE 8 is a circuit diagram.

In the illustrative embodiment, a constantly driving shaft is present, and power therefrom is employed for intermittent cyclic operation of a knife device.

The constantly driving shaft 20, FIGURE 1 and 2, has clutch teeth 21 at its end, for engagement with the clutch teeth 22 on the enlarged end 23 of an axially movable shaft 25 which is to be driven intermittently. The shaft 25 is supported for rotation and axial movement in bearings 26, 27 in the upstanding portions 28, 29 of a base 30 which can be secured on a general base plate TP. The shaft 25 has a split disk 31 clamped thereon by a screw 32, FIGURE 2. A sleeve 33 surrounds the shaft 25 and is fixed to rotate and slide axially therewith by a keying screw 34. The sleeve 33 has a flange or disk 35 fixed thereto and shown as integral in the drawings. This disk 35 includes first and second oppositely axially directed faces 100, 101, respectively, as is best illustrated in FIGURES 6 and 7, has a cam hump 36 with an inclined ramp surface 37 for engagement with a cam follower roller 40 and thereby effective to cause movement of the shaft 25 toward the right in FIGURES 1 and 2; the hump 36 has an abrupt axial surface 38 at the other end of its arcuate length. The disk 35 also has a stop block 42 at its right-hand face in FIGURES 1, 2, 4, 6, and 7. A second ramp projection 46 is at the same radial distance as the stop block 42, and is spaced therefrom by a gap 47, shown in FIGURES 6 and 7. A gear 43 likewise surrounds the shaft 25 and has axially directed dowel pins 44 which are force-fitted in the gear and freely movable into holes 45, FIGURES 2 and 7, in the sleeve 33 to establish angularly driving movement from the shaft 25 and sleeve 33 to the gear 43. The stop block 42, projection 46 and gap 47 define first means on the face 100 of the disk 35 cooperative with first means 63 in the form of a detent lever which, in conjunction with the hump or second means 36 of the disk 35 and the roller or second means 40, cooperate to control relative axial and rotational movement of the shafts 20, 25.

Two spring sleeves 48, 49 surround the shaft 25 and have projecting flanges for receiving the ends of a compression coil spring 50 which presses the sleeves 48, 49 apart so one bears against the stationary portion 29 and the other against the end of a gear 43.

The base 30 provides aligned ears 52, 53 for bearing sleeves 54 that support a pivot pin 55. A latch lever or rock lever 56 is fixed on the pin 55 and is pivotally connected at one end to the armature or core 57 of a solenoid 58 held on brackets 58a of the base portions 28, 29. A pivot screw 59 (FIGURE 2) at the other end of the lever 56 holds the inner race 60 of an anti-friction bearings 60a whose outer race forms the cam follower roller 40. A detent lever 61 is mounted beneath the lever 56 by a pivot screw 62 and has a downward lug 63 at its free end, located in the path of movement of the stop block 42, and occupying the gap 47, FIGURE 4, at the standstill or zero position in a cycle of operation. An upward projection 64 from the detent lever 61 extends through a larger hole 65 in the latch lever 56 to engage one end of a tension spring 66 which reacts against a stud 67 on the upper face of the lever 56, whereby the lever 61 is urged clockwise in FIGURE 1, so that the lug 63 is moved to and then held in the gap 47 at the close of a cycle. The latch lever 56 is urged counterclockwise in FIGURES 4 and 5, by a spring 68 which engages threaded studs 68a (FIGURES 1 and 4) on the base 30 and on the bottom of the lever 56, toward a position in which the roller 40 engages the hump 36 and holds the clutch teeth 21, 22 apart at the end of a cycle, while the lug 63 detains the stop block 42 ready for the beginning of the next cycle. A stop 69 on the base portion 28 determines the downward rocking of the latch lever 56 by spring 68, so that the roller 40 and detent lug 63 are in proper cooperative position relative to the disk 35.

The cyclic movements of shaft 25 in the illustrative employment causes respective single revolutions of the disk 31 on which the eccentric screw 75 supports the inner race of an anti-friction bearing 76 whose outer race 77 provides a follower acting against the walls of a slot 78, FIGURE 5, in a rockable punch or knife arm 79 which is pivoted on a shaft 80. The punch arm 79 has projections 81 at its free end which provide knife edges for cooperation with the knife plates 82, 83 fixed in the upper surface of the plate TP and defining edges of a hole 84 in the plate TP.

The load to be driven by the intermittent shaft 25 preferably varies during a cycle, with a low load at the starting and final portions of the cycle. This is illustrated by the action of the eccentric driver 77 in the slot 78, FIGURES 5, 5A and 5B. At the start of a cycle, the split ring 31 in the position of FIGURE 5 presents the driver 77 so that the load thereon is that of rocking the lever 79 clockwise to clear the top surface of plate TP: this is done at a long lever arm on lever 79 from its pivot 80, and low torque demand with the driver 77 slightly passes the top position of FIGURE 5A. Thus, there is little shock when the clutch teeth 21, 22 close and the intermittent shaft 25 begins its movement. Thereafter, the major loading occurs, as the lever 79 is actuated by driver 77 through the label cutting operation, FIGURE 5B, and the label applicator with the driver 77 then passing its lowest position. The continued movement of the driver 77 is an operation of lifting the lever 79 to the starting position of FIGURE 5, and again is with low loading of the driver 77 and therewith the shaft 25, so that momentum of the parts assures completion of the cycle even after the clutch teeth 21, 22 have been disengaged. A like trigonometric ratio effect can be employed for moving the shuttle bars 90, noting that they move the label strip over the plate aperture 84 when the knife lever 79 has been raised and then retreat, essentially without loading, in order to engage the next label of the strip and then come to a standstill at the end of a label feeding cycle.

The illustrative employment of the mechanism is for actuating a severing and applying device by which labels are cut from a strip and applied to an article such as an envelope. Such an illustrative employment is set out in my Patent 2,754,022; and the structure of a clutch of the instant general type is in my Patent 2,915,160. Parts for delivering the end label of the strip over the hole 84 are diagrammatically shown as shuttle bars 90 reciprocated in guides 91 by means not shown in detail but indicated by a shaft 92, FIGURE 4, driven by gear 93 in mesh with an idler 94 which in turn meshes with the gear 43. The diagrammed roller 95, FIGURE 5, is constantly driven for advancing articles such as envelope E beneath the plate TP and past the hole 84. Assuming that the shuttle bars 90 have advanced the label strip or sheet L, and that the last label has been cut therefrom and delivered to an article, in the preceding cycle, a first part of the movement of the shaft 25 in the direction of the arrows in FIGURES 1 and 2 in the new cycle has resulted in the raising of the punch arm or lever 79 by a short distance e.g., to the positive shown in FIGURE 5A, so the knife edges 81 thereof are above the top of plate TP and the label strip may pass beneath the knife edges and over the hole 84. The shuttle bars 90 are then actuated to so advance the label strip L so a portion LA, FIGURE 5B, overlies the hole 84. The action of follower 77 in slot 78 thereafter causes the punch arm 79 to move downward, counterclockwise about its pivot 80, and the knife edges 81 cooperate with the knife plates 82, 83 to sever a label area, as shown in FIGURE 5B: noting that the right-hand edge of the label strip, in FIGURES 5A and 5B, need not extend beyond the hole 84 and onto the top plate TP. It is preferred to have the projections 81 so shaped that the cutting of the label begins at a point nearer the pivot 80 and is completed at the knife plate 83. Continued downward rocking of the punch arm 79 causes the severed label LA to be pushed downward in the hole 84 until the roller 98, pivoted on the punch or knife arm 79 for rotation about an axis parallel to the roller 95, presses the label LA upon the upper surface of the passing article E moving over the counter-pressure roller 95. The further rotation of the intermittent or cycle shaft 25 then lifts the punch arm 79 to its initial position as in FIGURE 5.

A basic circuit diagram is shown in FIGURE 8, in which the latch lever 56 can be moved clockwise when the coil of solenoid 58 is energized, and moved counterclockwise by the spring 68 when the coil is deenergized. Assuming that an article E is passing, FIGURE 5, and closes a switch S at a time such that the further travel of the article will cause the label LA to be applied to a selected area of the article at a phase angle of the cycle of shaft 25 adequate for the delivery of a label over the hole 84 and the severance and downward delivery of the label by the punch arm 79, the closure of switch S causes current to flow from a supply conductor 200 by conductor 201 to the coil 202 of a control relay CR, with return by conductor 203. Closure of switch S also causes flow through the bridge 204 of relay CR to conductor 205 and through the coil of solenoid 58, with return by conductor 203. The pulse of current to solenoid 58 is interrupted when the bridge 204 of relay CR is lifted: noting that coil 202 remains energized as long as the article E holds the switch S closed.

Upon energization of the solenoid 58, the latch lever 56 is moved clockwise in FIGURES 4, 5 and 8 to the position shown in FIGURE 5A. The roller 40 is lifted from the arcuate path of cam hump 36, and the disk 35 is freed so the shaft 25 with its clutch teeth 22 is moved by the spring 50 toward the left in FIGURES 1 and 2 to engage teeth 21 on the constantly driven shaft 20. The latch lever 56 also lifts the detent lever 61 so its lug 63 releases the stop block 42 on the disk 35, noting that this disk is being released during the leftward movement (FIGURE 1), and therewith the disk 35 is freed so that the shaft 25 can begin rotation when the clutch teeth engage. The lug 63 and its lever 61 follow the disk 35, with the lug 63 engaging the margin of the disk 35 outside the projections 42 and 46. It is preferred to form the driving teeth 21 so axial faces thereof engage axial faces of the driven teeth 22, wherewith driving can start before the clutch teeth are fully engaged or bottomed in one another.

The shaft 25 begins to move in its cycle. Shortly thereafter, the control relay CR effects deenergization of the solenoid 58, and the latch lever 56 is drawn counterclockwise in FIGURES 4, 5 and 6 by the spring 68 from the position of FIGURE 5A back toward that shown in FIGURES 4, 5 and 5B, the movement being completed when the stop block 42 has left the lug 63. The roller 40 now engages the left-hand face of the disk 35, at the arc thereof outside the region of the hump face 36, and the projection 63 likewise engages the disk 35 for the arc thereof between the stop block 42 and the ramp 46 and at the radius of these parts 42, 46. The shaft 25 performs a cycle of movement, with label feeding, severing and delivery as set out above.

As the shaft 25 approaches its initial position, the cam ramp 37 comes against the follower roller 40 which is held by the latch lever 56 against movement along the axis of the shaft 25 and by reaction from the roller 40 causes the disk 35 with shaft 25 to move toward the right in FIGURES 1 and 2, until clutch teeth 22 are drawn from engagement with clutch teeth 21, and spring 50 is compressed. The intermittent shaft 25 and its associated parts do not stop immediately when the clutch teeth are disengaged, but coast down toward a standstill by momentum of the parts. The lug 63 of detent 62 has been riding on the end face of the disk 35 because of the spring 66, in the path of the stop block 42, and is encountered by this stop block so the shaft 25 and associated parts are now brought to a standstill at the end of the cycle of revolution. In the illustrated structure, the disk 35, FIGURES 6 and 7, is provided with a second ramp 46 at the same face as and accurately spaced from the stop block 42 by a distance providing the gap 47 for closely receiving the detent lug 63. As the parts approach the initial position, the ramp 46 causes the detent lever 61 to rock counterclockwise in FIGURE 1. The ramp 46 illustratively has a lower axial projection from the disk 35 than the stop block 42, FIGURE 6, so that the lug 63 will engage the block after leaving the ramp 46. The final rightward movement of the shaft 25 and the return of detent lever 61 by its spring 66 causes the block 42 and the abrupt end of the ramp 46 to engage the lug 63 and prevent its rebound from the intended initial position of the cycle.

In the event that it is desired to have the cycles repeat without closing of the switch S for each cycle, the normally open switch SS of FIGURE 8 can be closed, so that current flows from conductor 200 to conductor 205 and to the solenoid 58. The solenoid 58 remains energized and the roller 40 and detent lug 63 are held raised in the position of FIGURE 5A, and the roller 40 cannot cause the shaft 25 to move toward the right or cause the lug 63 to stop the same.

The illustrative employment for effecting cyclic movements by which labels are fed, severed and applied follows that of my Patent 2,754,022, to which reference is made for other circuit and structural features illustrative of manners of procuring the successive delivery of articles for receiving labels, with moistening for adhesion, with control by the presence of a label for attachment before an article is released.

It is obvious that the clutch mechanism and its controls can be made in other ways, and employed for other purposes, within the scope of the appended claims.

What is claimed is:

1. An intermittent drive assembly comprising coaxial driving and intermittent shafts and clutch means thereon for driving engagement therebetween upon relative movement of the shafts, spring means connected so as to urge the shafts into engagement, a control member fixed to the intermittent shaft, a rock lever movable about a pivot axis parallel to the shafts, means on the control member for causing relative movement of the shafts at the end of a cycle, a part carried on the rock lever for cooperative engagement with said means on the control member, said means on the control member have a stop block and a cam ramp peripherally spaced from said stop block by a gap, and a detent lever pivoted on the rock lever and having a projection for entering said gap.

2. A drive assembly as in claim 1, in which the stop block projects farther from the control member than the cam ramp.

3. A drive assembly as in claim 2, including a spring for moving the detent lever for moving its projection into said gap when the projection is in contact with the stop block.

4. An intermittent drive assembly for a cyclically operating device having a low load demand at the beginning and the end of a cycle, comprising coaxial driving and intermittent shafts and clutch means thereon for driving engagement therebetween upon relative movement of the shafts, said intermittent shaft having a connection piece thereon for driving said device, spring means connected so as to normally urge the clutch means into engagement, a rock lever movable about a pivot axis parallel to the shafts, a control member fixed to the intermittent shaft and having a cam ramp and a stop block peripherally spaced thereon, means carried by the rock lever and cooperative with the control member for effecting a clutch disengaging movement of the intermittent shaft near the end of a cycle and effective upon rocking of the rock lever to another position for permitting the clutch engagement by said spring means, a detent lever pivoted on said rock lever and having a part for entering the space between the stop block and cam ramp to determine the position of the control member at the end of the cycle, the relative peripheral locations of the connection piece, said cam ramp and stop block, and said disengaging means being selected and fixed so that the operating device is held at a standstill at the said low load demand condition.

5. An intermittent drive assembly comprising a driving shaft having first clutch parts thereon, an intermittently driven shaft having second clutch parts thereon for cooperation with said first clutch parts upon relative axial movement of said shafts, a control member connected for rotation with said intermittent shaft and having first and second cam ramp portions thereon, means for effecting relative movement of one said shaft into clutching engagement with the other, a rock lever pivoted to move about an axis parallel to said intermittent shaft, a cam follower on said rock lever for engagement with said first cam ramp portion and therewith effective to produce a separating movement of said shafts, a detent lever pivoted on said rock lever and having a projection for engagement and to be rocked by said said second cam ramp portion, means for urging said detent lever against said rocking thereof by the second cam ramp, and a stop block peripherally spaced on said control member from said second cam ramp, said detent lever projection being adapted to be received in the space between said second cam ramp and said stop block for determining the position of parts at the end of a cycle of movement of said intermittent shaft.

6. A clutch and actuator structure comprising a driving member, a member to be driven intermittently and including an axially movable shaft, interengageable clutch portions on said members, a latch lever pivoted so one end can be moved relative to said shaft, first and second cam portions fixed on the shaft for axial and rotational movements therewith, a roller journalled on the latch lever and movable therewith relative to the shaft for selectively occupying a position of engagement with the first cam portion and a position free thereof, a stop block fixed on the shaft for axial and rotational movements therewith, said stop block being peripherally spaced from said second cam portion by a gap, a detent lever pivoted on said latch lever for movement therewith, said detent lever having a lug for engagement in said gap, first spring means for rocking said detent lever whereby to move said lug into said gap by movement in the direction of the shaft axis, means for rocking said latch lever and second spring means for returning the latch lever when so rocked, and third spring means connected so as to urge the shaft axially and thereby effecting engagement of said clutch portions.

7. A clutch mechanism comprising driving and driven shafts and clutch means cooperative therebetween for driving engagement of the driven shaft by the driving shaft upon the operation of said clutch means, means connected so as to normally urge said clutch means to an operative driving position, a control member drivingly connected to one of said shafts, control means mounted for pivoting movement toward and away from said control member in a plane normal to the axes of said shafts about a pivot parallel to said shaft axes, said control member having first and second oppositely directed axial faces, first and second means on the respective first and second faces of the control member cooperative with respective first and second means of said control means for causing relative movement between the shafts, the first means of the control member and the first means of the control means being interlocked at the first face of the control member in a first position to prevent rotary movement of one of said shafts in at least one direction and being disengaged in a second position to permit relative movement in said one direction, and the second means of the control member and the second means of the control means being operative in a first position for preventing relative axial movement between said shafts in a second direction and being operative in a second position for permitting engagement of said clutch means whereby rotation imparted to said driving shaft is transmitted to said driven shaft.

8. An intermittent drive assembly comprising driving and intermittent shafts and clutch means thereon for driving engagement therebetween upon relative movement of the shafts, spring means connected so as to urge the shafts into engagement, a control member fixed to the intermittent shaft, said control member having first and second oppositely directed axial faces, first and second means on the respective first and second faces of the control member, a lever pivotally mounted for movement toward and away from said control member in a plane normal to the axes of said shafts about a pivot parallel to said shaft axes, first and second means carried by said lever for cooperation with the respective first and second means of said control member for causing relative movement of the shafts, each of said first means being interlocked in a first position to prevent movement of said shafts in at least a first direction and being disengaged in a second position to permit movement of said shafts in said first direction, and each of said second means being operative in a first position for preventing said urging means from operating to engage said clutch means and being operative in a second position for permitting engagement of said clutch means whereby rotation imparted to said driving shaft is transmitted to said intermittent shaft.

9. An intermittent drive assembly comprising coaxial driving and intermittent shafts and clutch means thereon for driving engagement therebetween upon relative movement of the shafts, spring means connected so as to urge the shafts into engagement, a control member fixed to one of the shafts, means on the control member for causing relative movement of the shafts, a lever mounted for movement toward and away from the control member, the control member including first and second oppositely directed axial faces, one of said faces including a stop block and a cam ramp peripherally spaced from each other to define therebetween a gap, another of said faces including another cam ramp, said lever including a projection for entering said gap, and said lever further including cam means for cooperating with said another cam ramp.

10. An intermittent drive assembly comprising coaxial driving and intermittent shafts and clutch means thereon for driving engagement therebetween upon relative movement of the shafts, spring means connected so as to urge the shafts into engagement, a control member fixed to one of said shafts, means on the control member for causing relative movement of the shafts at the ends of a cycle, a lever mounted for movement toward and away from said control member, said lever including first and second cam followers, means mounting said first and second cam followers for movement relative to each other, a stop block and a cam ramp peripherally spaced from said stop block by a gap on said control member and cooperative with said first cam follower for preventing movement of one of said shafts in a first direction in a first position and permitting movement of said shafts in said first direction in a second position, and further cam means cooperative with said second cam follower in a first position for preventing engagement of said shafts by said clutch means but permitting such engagement in a second position of said last mentioned cam follower and cam means.

11. An intermittent drive assembly comprising driving and intermittent shafts and clutch means for driving engagement therebetween upon relative movement of the shafts, means connected so as to urge the shafts into engagement, a control member drivingly connected to one of said shafts, said control member having first and second oppositely directed axial faces, first and second means on the respective first and second faces of the control member, a lever pivotally mounted for movement toward and away from said control member in a plane normal to the axes of said shafts about a pivot parallel to said shaft axes, first and second means carried by said lever for cooperation with the respective first and second means of said control member for causing relative movement of the shafts, each of said first means of said control member and lever being interlocked in a first position to prevent movement of at least one of said shafts in at least a first direction and being disengaged in a second position to permit movement of at least one of said shafts in said first direction, and each of said second means being operative in a first position for preventing said urging means from operating to engage said clutch means and being operative in a second position for permitting engagement of said clutch means whereby rotation imparted to said driving shaft is transmitted to said intermittent shaft.

References Cited by the Examiner
UNITED STATES PATENTS

| | | | |
|---|---|---|---|
| 489,279 | 1/1893 | White | 192—24 |
| 878,051 | 2/1908 | Eberhardt | 192—148 |
| 2,011,629 | 8/1935 | Hahnemann et al. | 192—24 |
| 2,224,192 | 12/1940 | Madsen | 192—33 X |
| 2,711,237 | 6/1955 | Wylie | 192—33 |

DON A. WAITE, *Primary Examiner.*

DAVID J. WILLIAMOWSKY, *Examiner.*